(12) United States Patent
Bork

(10) Patent No.: US 8,875,572 B2
(45) Date of Patent: Nov. 4, 2014

(54) APPARATUS FOR ROTATABLY MOUNTING A ROTOR TO BE BALANCED

(75) Inventor: Bernhard Bork, Gernsheim (DE)

(73) Assignee: Hofmann Maschinen-und Anlagenbau GmbH, Worms-Rheinduerkheim (DE)

( * ) Notice: Subject to any disclaimer, the term of this patent is extended or adjusted under 35 U.S.C. 154(b) by 307 days.

(21) Appl. No.: 13/227,973

(22) Filed: Sep. 8, 2011

(65) Prior Publication Data

US 2012/0060603 A1  Mar. 15, 2012

(30) Foreign Application Priority Data

Sep. 9, 2010 (DE) .......................... 10 2010 044 849

(51) Int. Cl.
*G01M 1/16* (2006.01)
*G01M 1/00* (2006.01)
*G01M 1/06* (2006.01)
*G01M 1/24* (2006.01)
*G01M 1/04* (2006.01)

(52) U.S. Cl.
CPC . *G01M 1/04* (2013.01); *G01M 1/06* (2013.01); *G01M 1/24* (2013.01)
USPC ...................... 73/460; 73/66; 73/475; 73/487

(58) Field of Classification Search
CPC ............ G01M 1/04; G01M 1/24; G01M 1/06
USPC ...................................... 73/66, 460, 475, 487
See application file for complete search history.

(56) References Cited

U.S. PATENT DOCUMENTS

| | | | |
|---|---|---|---|
| 7,946,172 B2 | 5/2011 | Rogalla et al. | |
| 2006/0130576 A1* | 6/2006 | Turner et al. | 73/462 |
| 2008/0141773 A1* | 6/2008 | Rogalla et al. | 73/461 |
| 2008/0260311 A1* | 10/2008 | Thelen et al. | 384/438 |
| 2008/0289416 A1* | 11/2008 | Thelen | 73/471 |

FOREIGN PATENT DOCUMENTS

| | | |
|---|---|---|
| DE | 40 37 745 A1 | 6/1991 |
| EP | 0 410 331 A2 | 1/1991 |
| EP | 0 743 511 A1 | 11/1996 |
| EP | 1 936 347 A2 | 6/2008 |

* cited by examiner

*Primary Examiner* — Hezron E Williams
*Assistant Examiner* — Gregory J Redmann
(74) *Attorney, Agent, or Firm* — Crowell & Moring LLP

(57) ABSTRACT

An apparatus for rotatably mounting a rotor to be balanced is provided. The apparatus include a rotatably mounted balancing spindle to which the rotor to be balanced is to be non-rotatingly connected, at least one bearing block, a plurality of spring bars aligned parallel to the spindle axis and used to mount the balancing spindle on the bearing block such that the balancing spindle is able to vibrate, and a drive mechanism for the balancing spindle. The spring bars are arranged in more than two planes at different distances from the spindle or in planes having different rotary angular positions about the spindle axis.

14 Claims, 15 Drawing Sheets

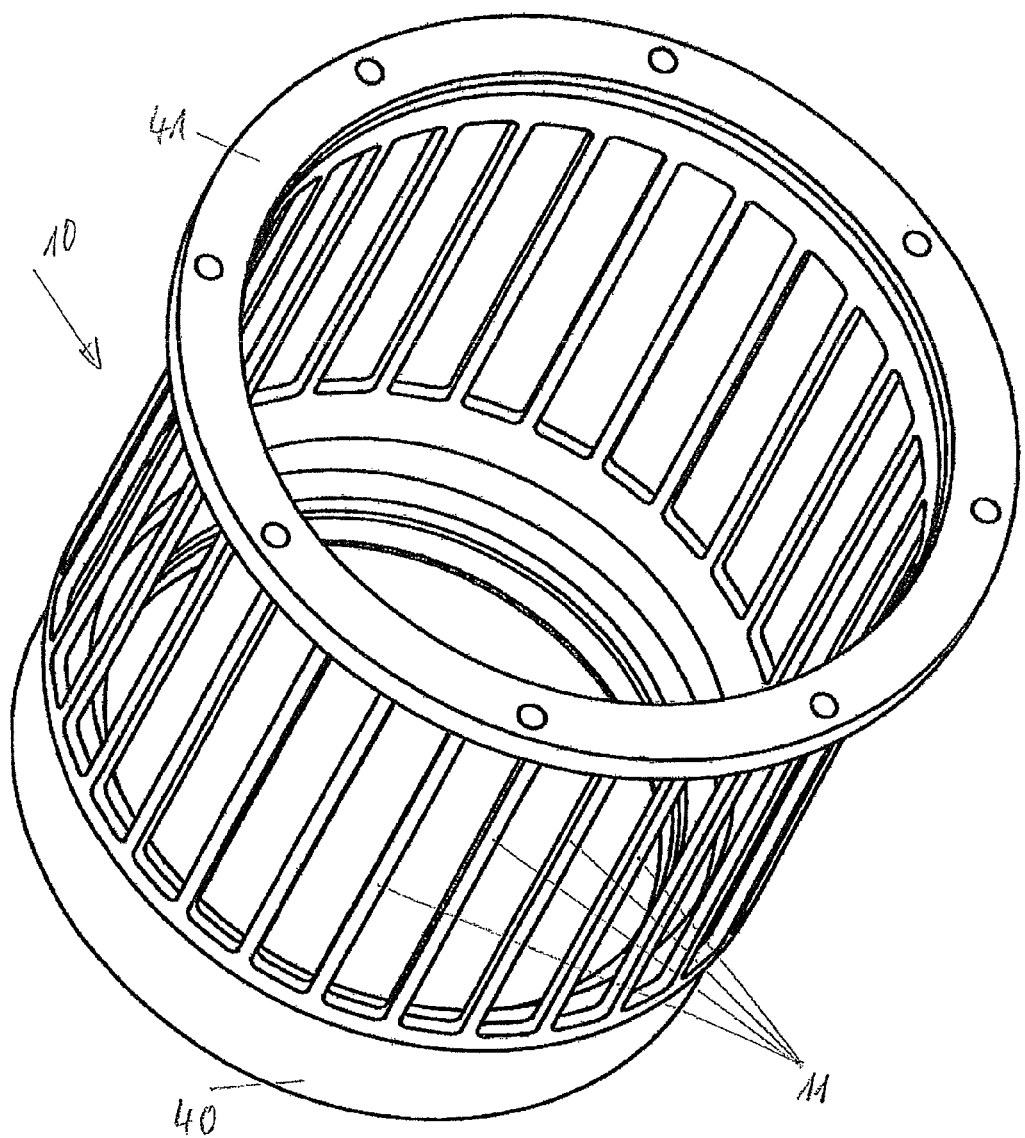

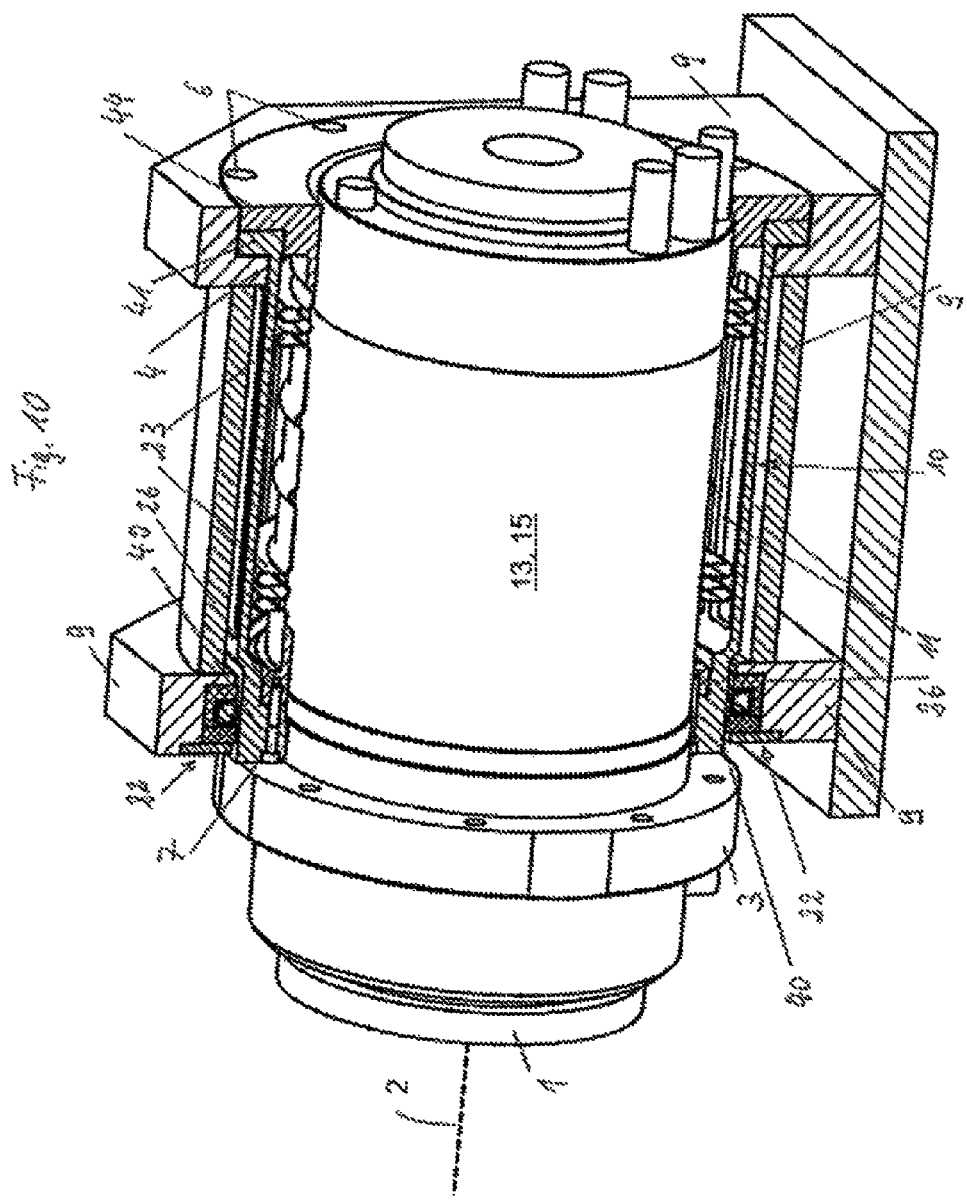

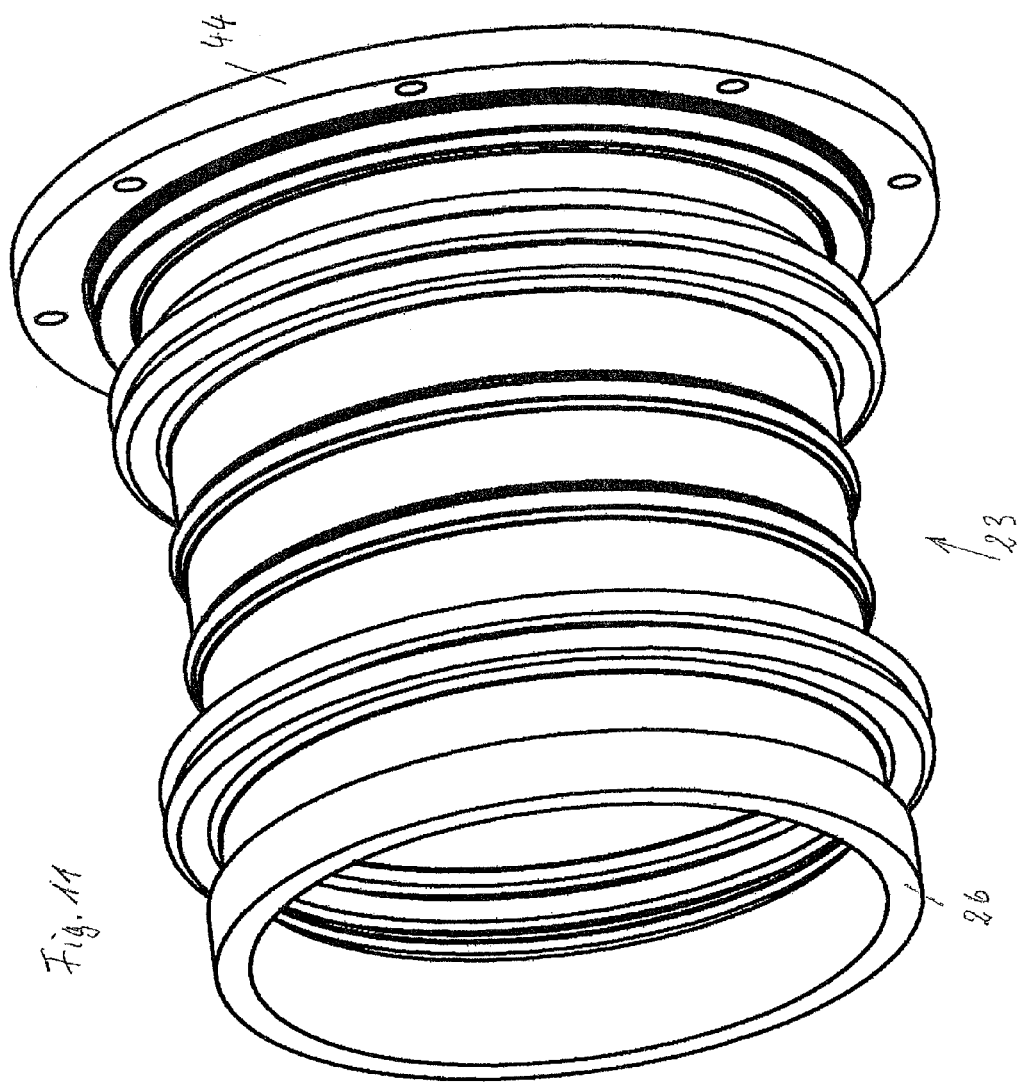

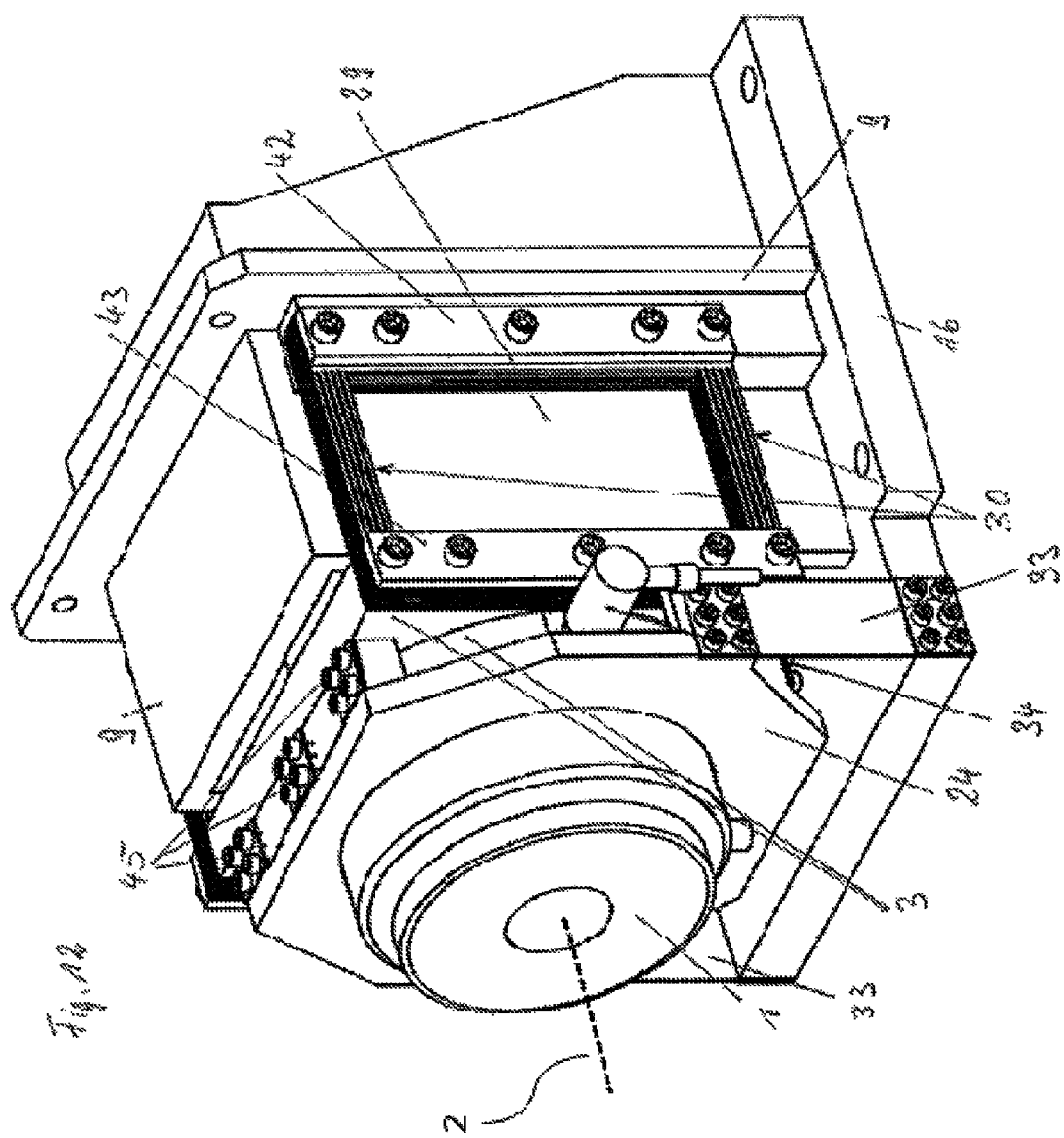

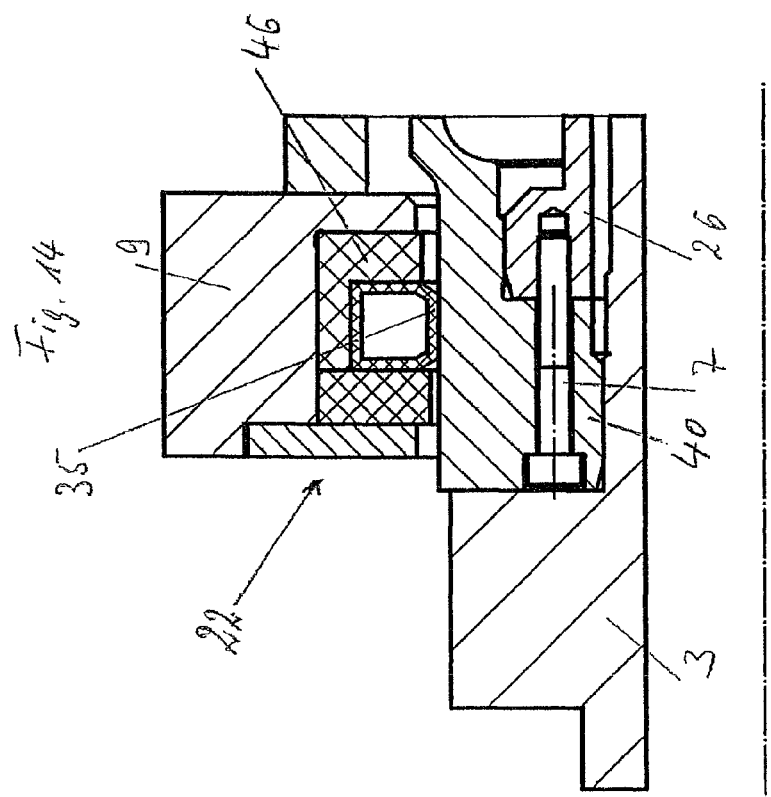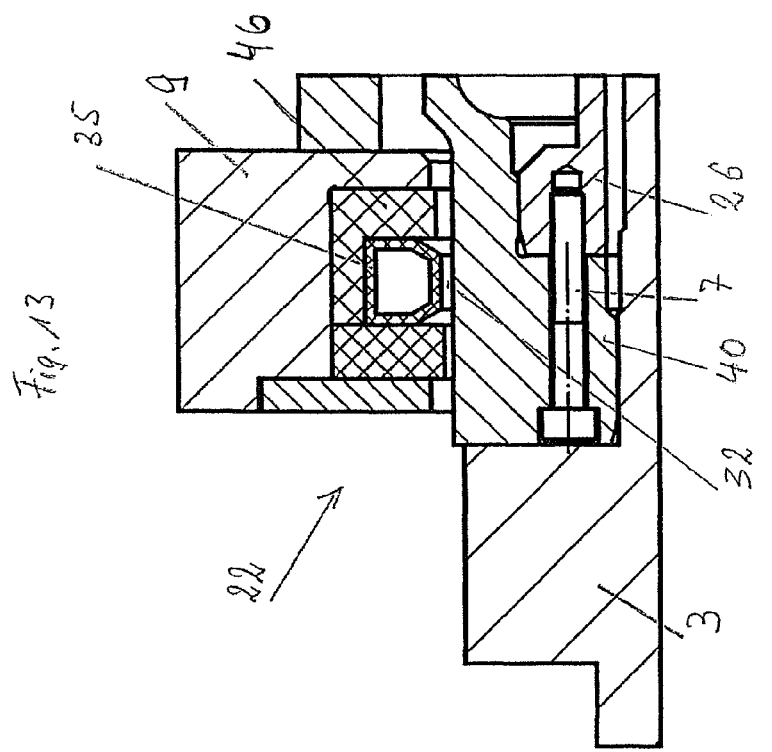

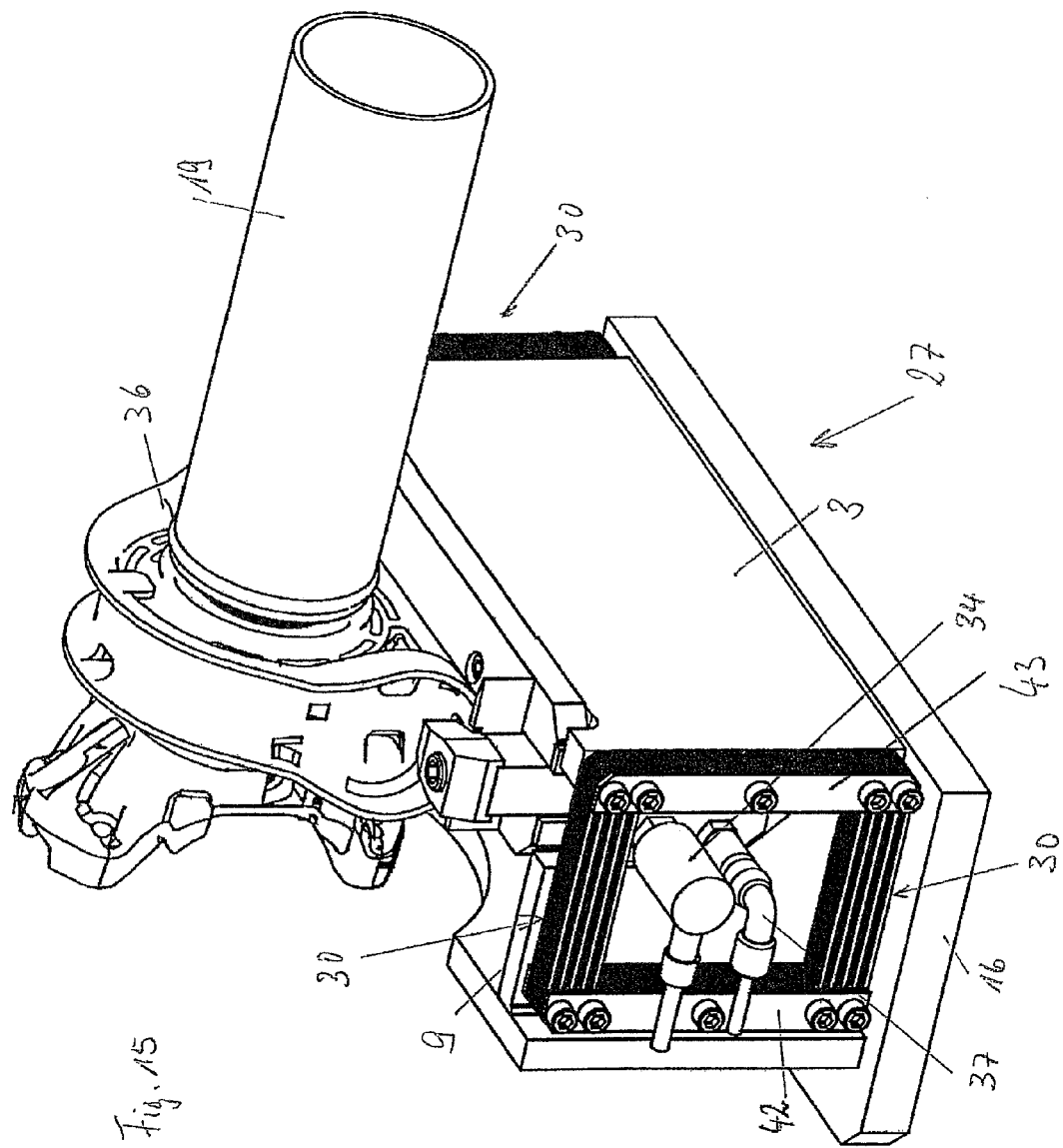

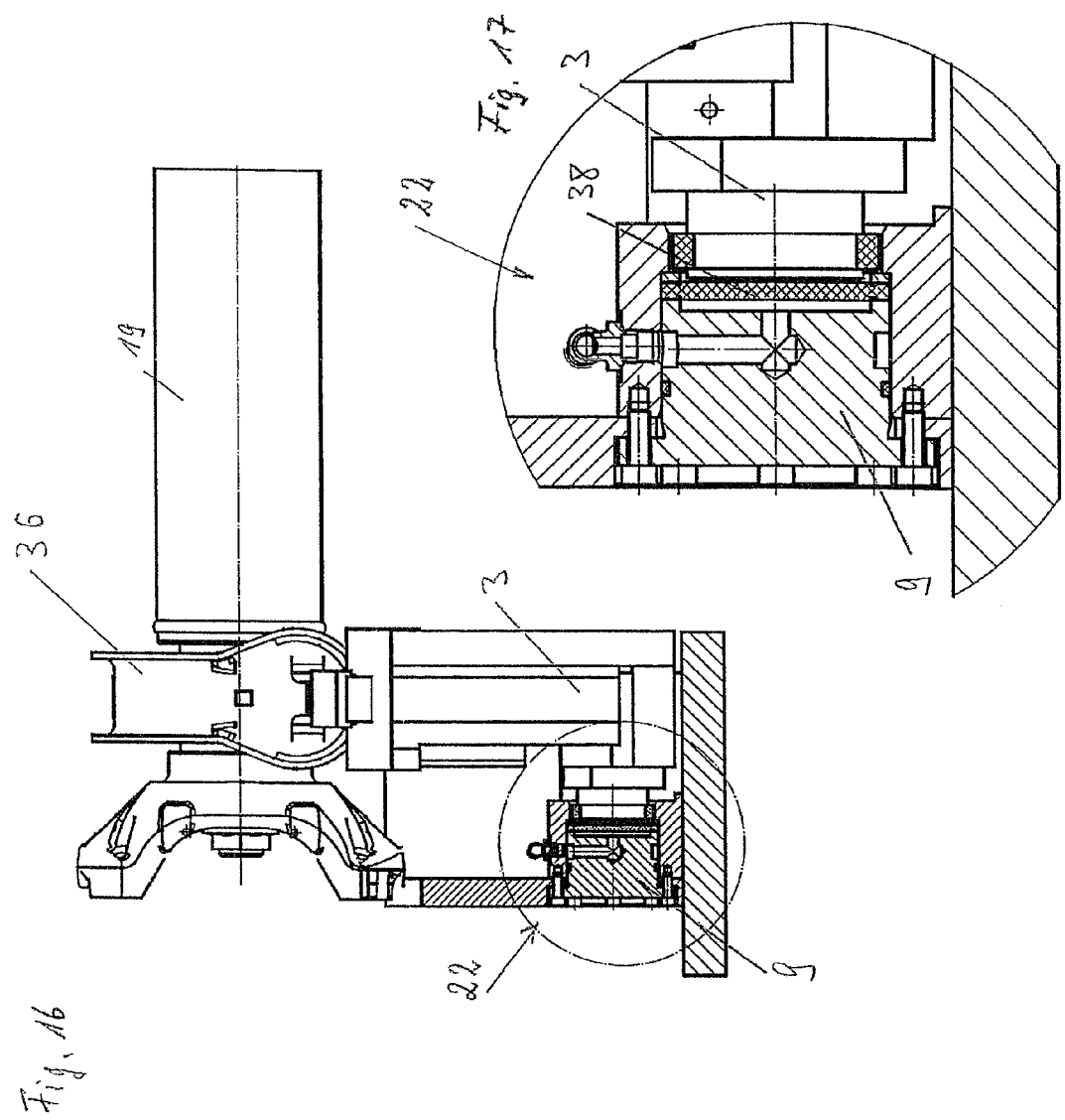

APPARATUS FOR ROTATABLY MOUNTING A ROTOR TO BE BALANCED

BACKGROUND AND SUMMARY OF THE INVENTION

The invention relates to an apparatus for rotatably mounting a rotor to be balanced.

Such an apparatus is known from European Patent Publication No. EP 1 936 347 A2. The known-rotatable mounting, which is embodied as an articulated shaft mounting in a balancing machine, includes spring-loaded support of a vibrating upper part. The latter includes a rotatably mounted spindle with a chuck for clamping one end of an articulated shaft, and a motor for driving the spindle. The spring bars are aligned parallel to the rotational axis and arranged in equal numbers in two parallel vertical planes that are equidistant from the rotational axis of the spindle. At least two spaced-apart groups of spring bars are provided in each plane. The stiffness of the spring bars in the axial direction is at least 100 times greater than their radial bending stiffness. The aim is to be able, by this means, to measure supercritical unbalances on the rotor in a broad range of resonance-free rotation speeds.

Driving the rotor to be balanced directly with a motor and disposing the motor between leaf springs or compression springs that support the motor and the rotor so that they are able to vibrate, is known from EP 0 410 331 A2.

The object of the present invention is to provide an apparatus of the kind initially specified for rotatably mounting a rotor to be balanced, said apparatus having a compact structure and permitting unbalance to be measured in a broad range of rotational speeds free of resonance.

In this invention, the rotatably mounted balancing spindle with which the rotor to be balanced is to be non-rotatingly connected is mounted, via a plurality of spring bars aligned parallel to the spindle axis, to at least one bearing block such that the balancing spindle is able to vibrate. During measurement of unbalance, the balancing spindle is driven by a drive mechanism, in particular by an electric motor. The spring bars are arranged in more than two planes spaced at different distances from the spindle axis, or in planes having different rotary angular positions about the spindle axis. The planes at different distances from the spindle axis are preferably arranged parallel to each other and may be equidistant from each other. The plurality of planes preferably intersect at right angles.

When the spring bars are arranged in the planes having different rotary angular positions about the spindle axis, said planes are preferably at equal angular distances from each other.

The spring bars may be arranged on different circumferences about the spindle axis, the circumferences preferably being radially equidistant from each other. It is also possible to arrange all the spring bars on one circumference, preferably at equal angular distances from each other.

The spring bars preferably have circular cross-sections. However, cross-sections differing from the circular are also possible, in particular rectangular, square or sector-shaped cross-sections for the spring bars.

Due to the spring bars, the balancing spindle is mounted on the bearing block in a largely isotropic (semi-isotropic) manner. It is preferred that the balancing spindle mounted via the spring bars on the bearing block is embodied as a single-plane flywheel in a plane perpendicular to the spindle axis, and is able to vibrate. The unbalance is preferably measured in the supercritical range of the mounting that is able to vibrate. For this purpose, the one ends of the spring bars are rigidly connected to the bearing block, and the other ends of the spring bars are connected to a rigid frame that is able to vibrate and which bears the balancing spindle, so as to form the single-plane flywheel. The spring bars are preferably connected by screw connections to the bearing block and to the rigid frame that is able to vibrate. However, it is also possible to connect the ends of the spring bars integrally, by welding or in some other way, to the bearing block or to the rigid frame that receives the rotatable mounting of the balancing spindle.

A mechanism that alters the resonance of the vibrating system, more specifically a vibration damping mechanism, is preferably provided between the bearing block and the frame that is able to vibrate and which rotatably bears the balancing spindle. This causes damping or reduction of the amplitudes of the vibrating system when the speed of the rotor to be balanced passes through the resonance range of the vibrating system, e.g. when increasing the speed into the supercritical resonance range in which the unbalance is being measured.

In addition, a torque support which is torsionally resistant about the spindle axis and flexible in at least the measuring direction is preferably provided between the bearing block and the balancing spindle. The direction of measurement is oriented perpendicular to the spindle axis.

The electric drive for the balancing spindle is preferably configured in such a way that the balancing spindle is disposed coaxially in relation to the rotor of the electric motor and is preferably connected non-rotatingly to the rotor of the electric motor. To this end, the balancing spindle may be non-rotatingly connected to the rotor in an axial recess or in an axial cavity through the rotor of the electric motor. Electrical insulation may be provided between the housing of the electric drive mechanism, in particular of the electric motor, and a clamping device provided on the balancing spindle for the rotor.

In order to measure the unbalance of elongate rotors, in particular cardan shafts, each end of the elongate rotor is preferably mounted in a rotatable mounting. To adapt the apparatus to different lengths of rotor, the respective bearing block of the rotatable mounting may be axially adjustable in relation to the spindle axis. Another rotatable mounting with the same arrangement of spring bars as with the rotatable mounting on the rotor end, and forming a centre mounting between the two rotatable mountings at the rotor ends, may also be provided in a preferential manner for the elongate rotor. However, said centre mounting does not include a drive mechanism.

In this invention, the ratio of the axial stiffness of the balancing spindle mounting to its radial stiffness may reach values in excess of 1000.

BRIEF DESCRIPTION OF THE DRAWING FIGURES

Embodiments of the invention shall now be described with reference to the Figures, in which FIG. 1 shows a first embodiment;

FIG. 9 shows an embodiment of a spring cage, in which the spring bars are arranged as shown in FIG. 8, wherein said spring cage may be used in the embodiment shown in FIG. 1;

FIG. 10 shows another embodiment of the invention, in which the spring cage shown in FIG. 9 is used and which includes a device for changing the resonance of the vibrating system and a torque support for the balancing spindle;

FIG. 11 shows an embodiment of a torque support, as may be used in the embodiment shown in FIG. 10;

FIG. 12 shows another embodiment of the invention, comprising an arrangement of spring bars as shown in the embodiment in FIG. 2 and a torque support for the balancing spindle;

FIG. 13 shows an embodiment for a device for influencing the vibration characteristics of the vibration system in the idle state, and which may be used in the embodiments of the rotatable mounting shown in FIGS. 2 and 10;

FIG. 14 shows the apparatus of FIG. 13 in the state in which it is actuated to dampen vibrations;

FIG. 15 shows an embodiment of a centre mounting, comprising a rotatable mounting for an elongate rotor to be balanced, in particular a cardan shaft;

FIG. 16 shows a partially cutaway view of the centre mounting shown in FIG. 15, comprising a device for influencing the vibration characteristics of the vibrating system; and FIG. 17 shows an enlarged view of the device for influencing the vibration characteristics of the vibrating system, as used in accordance with FIGS. 15 and 16.

DETAILED DESCRIPTION

Figure 1:
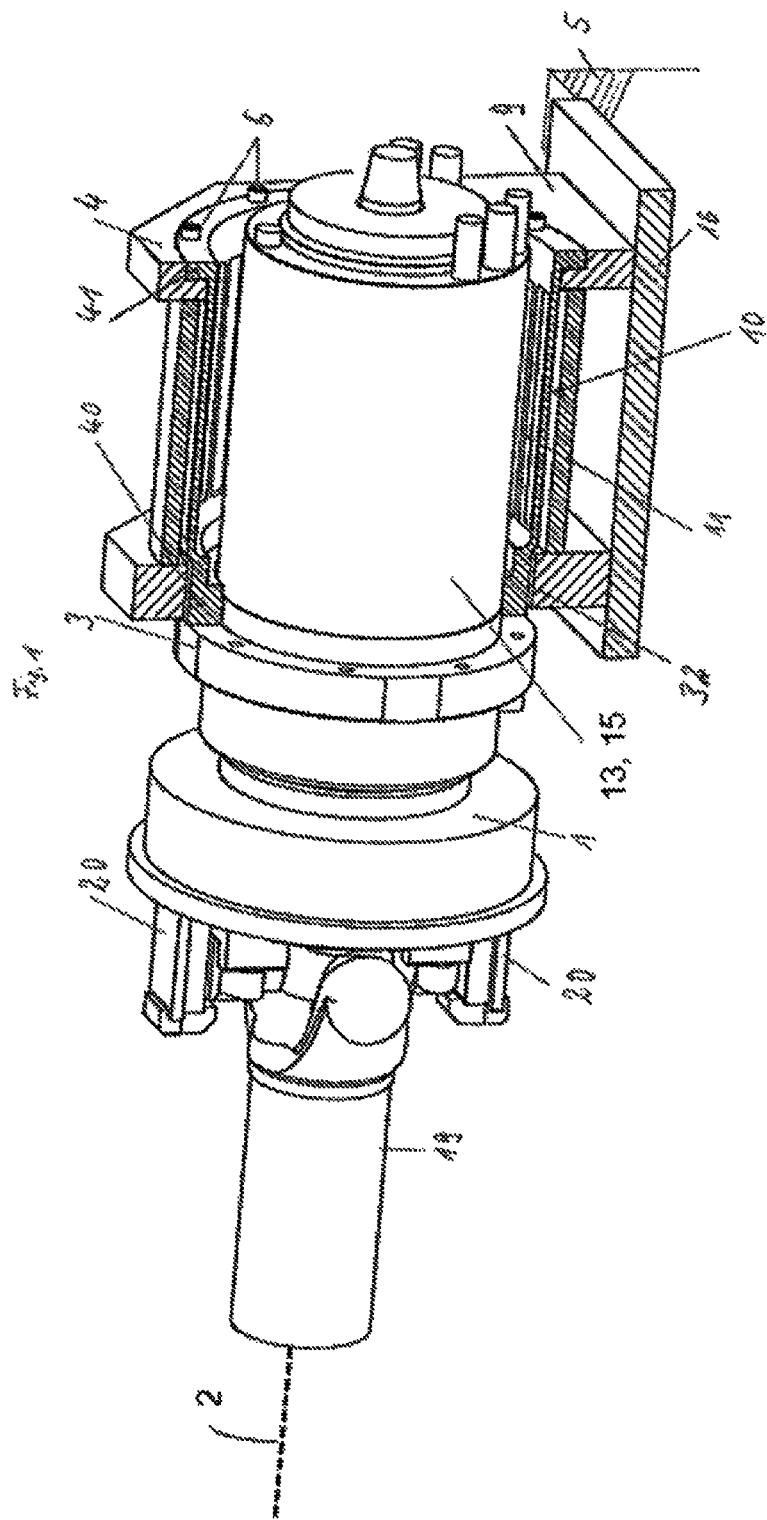

The embodiments shown in FIGS. 1, 2, 10 and 12 are used for rotatably mounting a rotor to be balanced 19, which may be embodied as an elongate rotor, in particular a cardan shaft. The apparatus shown in the Figures have a rotatably mounted balancing spindle 1 to which the rotor to be balanced 19 is to be connected non-rotatingly with the aid of a clamping device 20 during the measuring run. Balancing spindle 1 is mounted to a bearing block 9 by means of a plurality of spring bars 11 aligned parallel to spindle axis 2, such that the spindle is able to vibrate. A drive mechanism 13, which contained in housing 15 FIGS. 1 and 10 and not illustrated in FIGS. 2 and 12, embodied as an electric drive mechanism, in particular as an electric motor, is used to drive balancing spindle 1. In FIGS. 1, 2, 10 and 12, spindle axis 2 of balancing spindle 1 is horizontally oriented in the apparatus shown. However, it is also possible for balancing spindle 1 to be supported on bearing block 9 with its spindle axis 2 vertical, or disposed in an angular position between vertical and horizontal. In place of elongate rotors, other rotors such as motor vehicle wheels, turbines or the like may also be balanced.

FIGS. 4-9 show preferred arrangements for spring bars 11, with which balancing spindle 1 may be supported on bearing block 9. The arrangements of spring bars shown in FIGS. 4, 5 and 6 may be used in the embodiments shown in FIGS. 2 and 12. These arrangements of spring bars consist of four groups of spring bars 30. Each group of spring bars 30 contains spring bars 11 arranged in a rectangle or square. The respective spring bars 11 are uniformly arranged in the square or rectangle of the cross-section of each spring bar group 30. The spring bars 11 in each group of spring bars 30 extend in planes 17 and 18 running parallel to spindle axis 2. Planes 17 and 18 intersect at right angles. The respective planes 17 and 18 are equidistant from each other. This means that the spring bars 11 in each group of spring bars 30 are also equidistant from each other within planes 17 and 18. As can be seen from FIGS. 4-6, the groups of spring bars 30 are arranged at the four corners of a rectangle or square, the diagonals of which intersect in spindle axis 2. The four groups of spring bars 30 each contain the same number of spring bars 11. More than four groups of spring bars may be provided.

Figure 4:
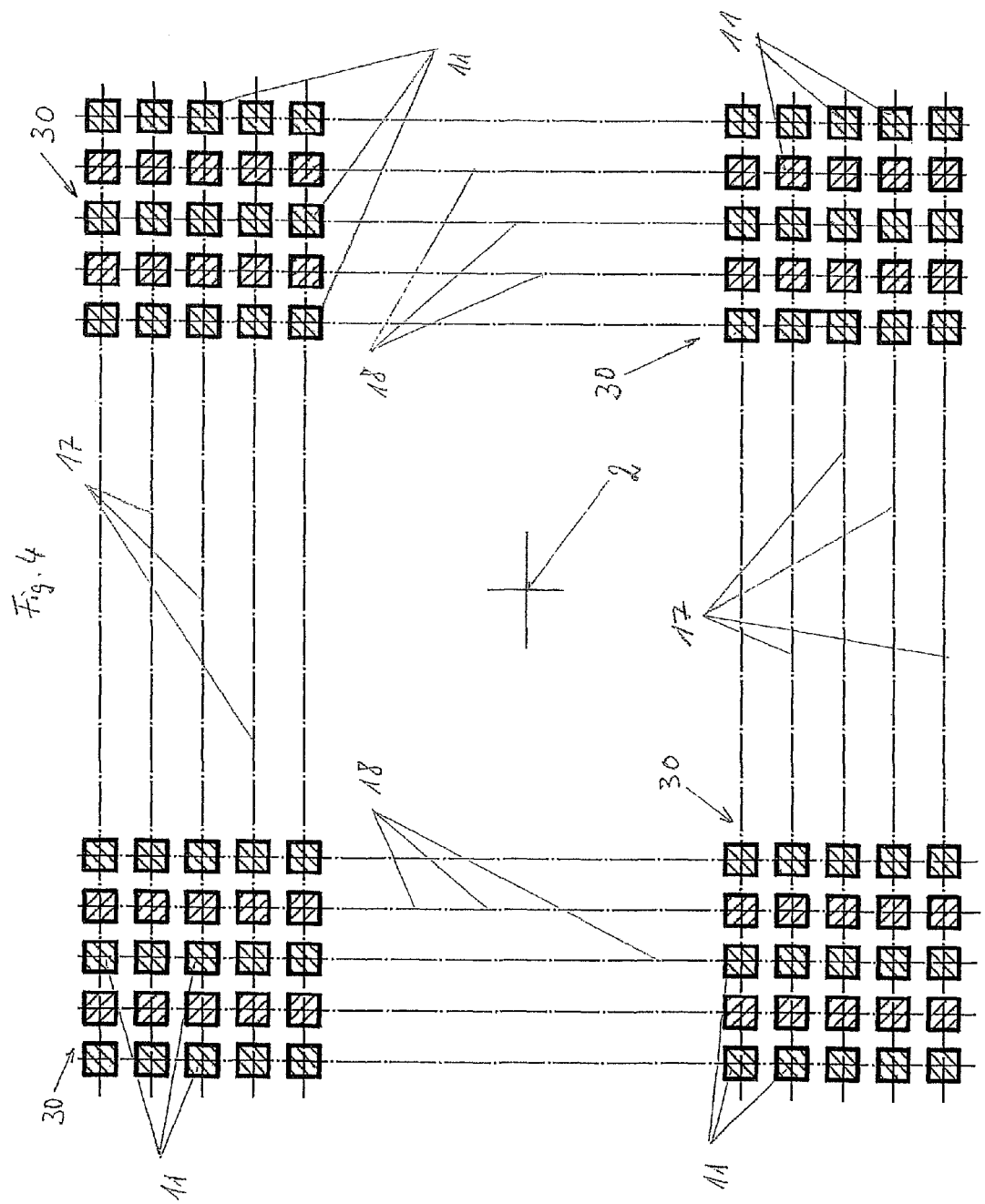
FIG. 4 shows an arrangement of spring bars which may be used in the embodiment shown in FIG. 2.
Figure 5:
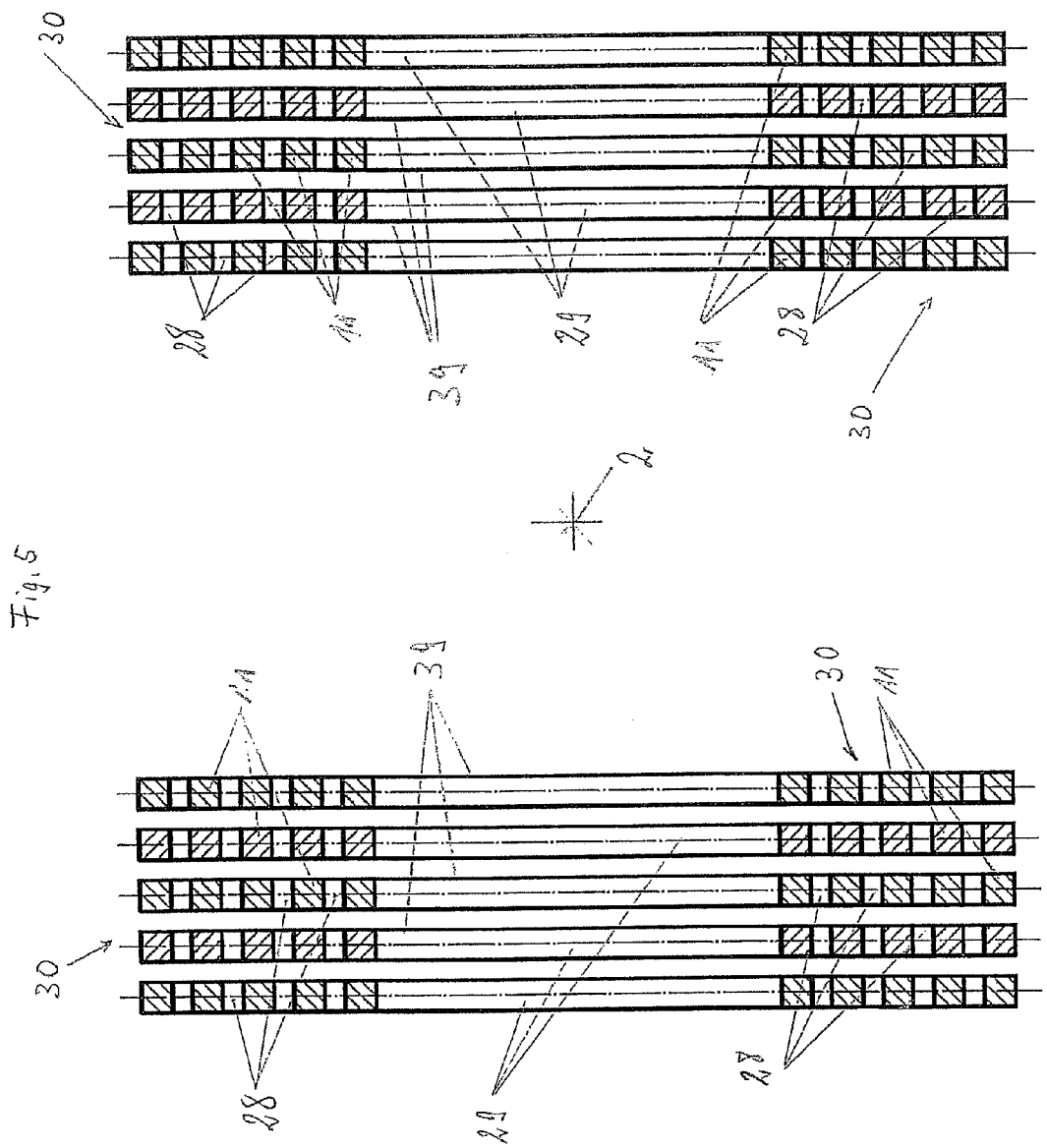
FIG. 5 shows another arrangement of spring bars which may be used in the embodiment shown in FIG. 2.
Figure 6:
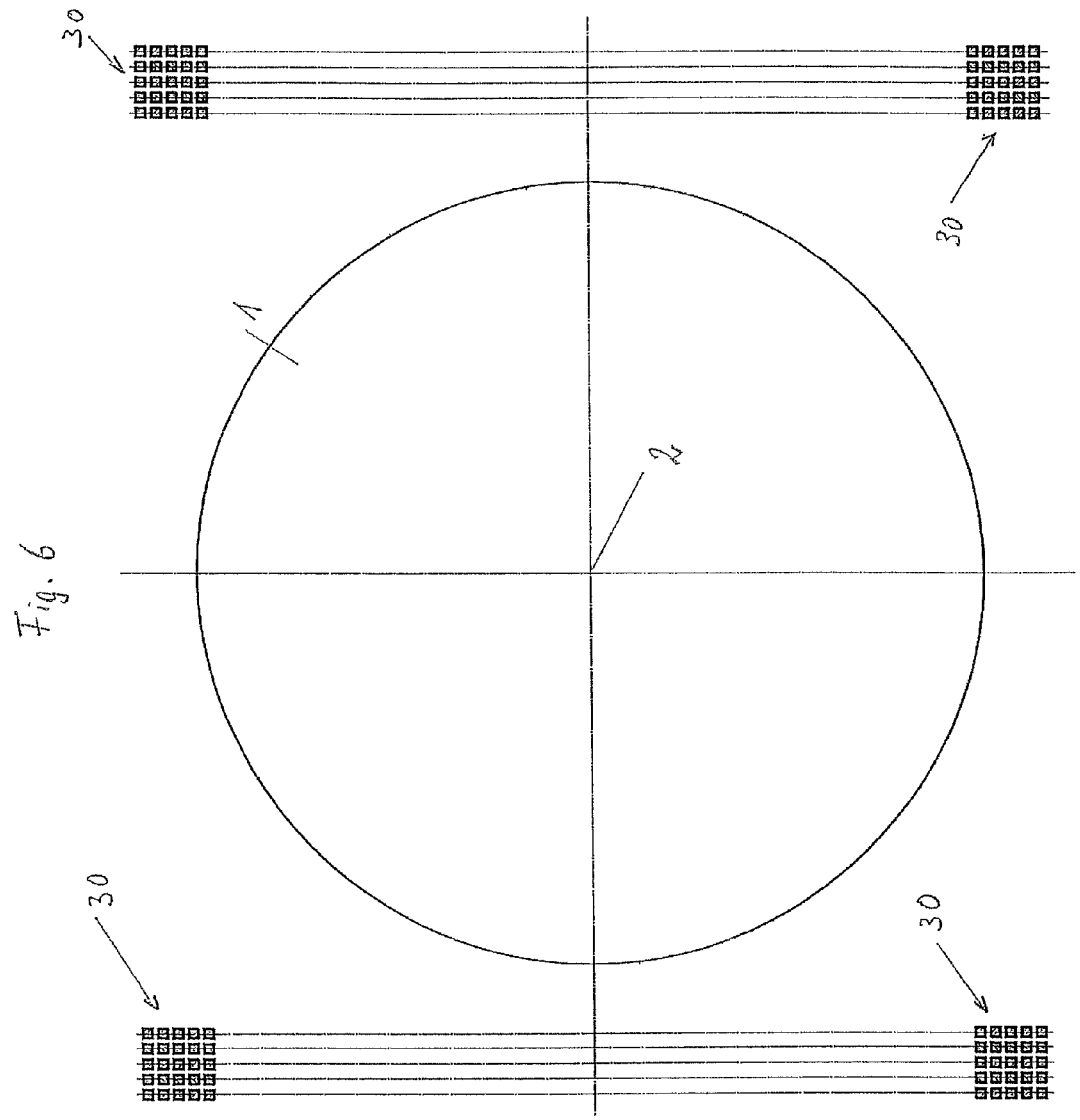
FIG. 6 shows an arrangement of spring bars relative to the axis of the balancing spindle, as may be used in the embodiment shown in FIG. 2.

In the embodiment shown in FIGS. 4 and 6, spring bars 11 are embodied as single spring bars with a square cross-section. Instead of the square cross-section, the spring bars may also have circular cross-sections or elliptical, sector-shaped or other suitably shaped cross-sections. In the embodiment shown in FIG. 5, spring bars 11 are made from slotted metal sheets 39 that are arranged parallel and spaced apart from each other. Between the single spring bars, slots 28 are provided in metal sheets 39 to form the spring bars with the arrangements of the groups of spring bars 30 shown in FIGS. 4 and 6. Metal sheets 39 are arranged parallel to each other on either side of the spindle axis, wherein recesses 29 are provided in each group of metal sheets. Two groups of spring bars 30 are formed on each group of metal sheets. The arrangement of spring bars 11 thus achieved in relation to spindle axis 2 is the same as in FIGS. 4 and 6.

Figure 7:
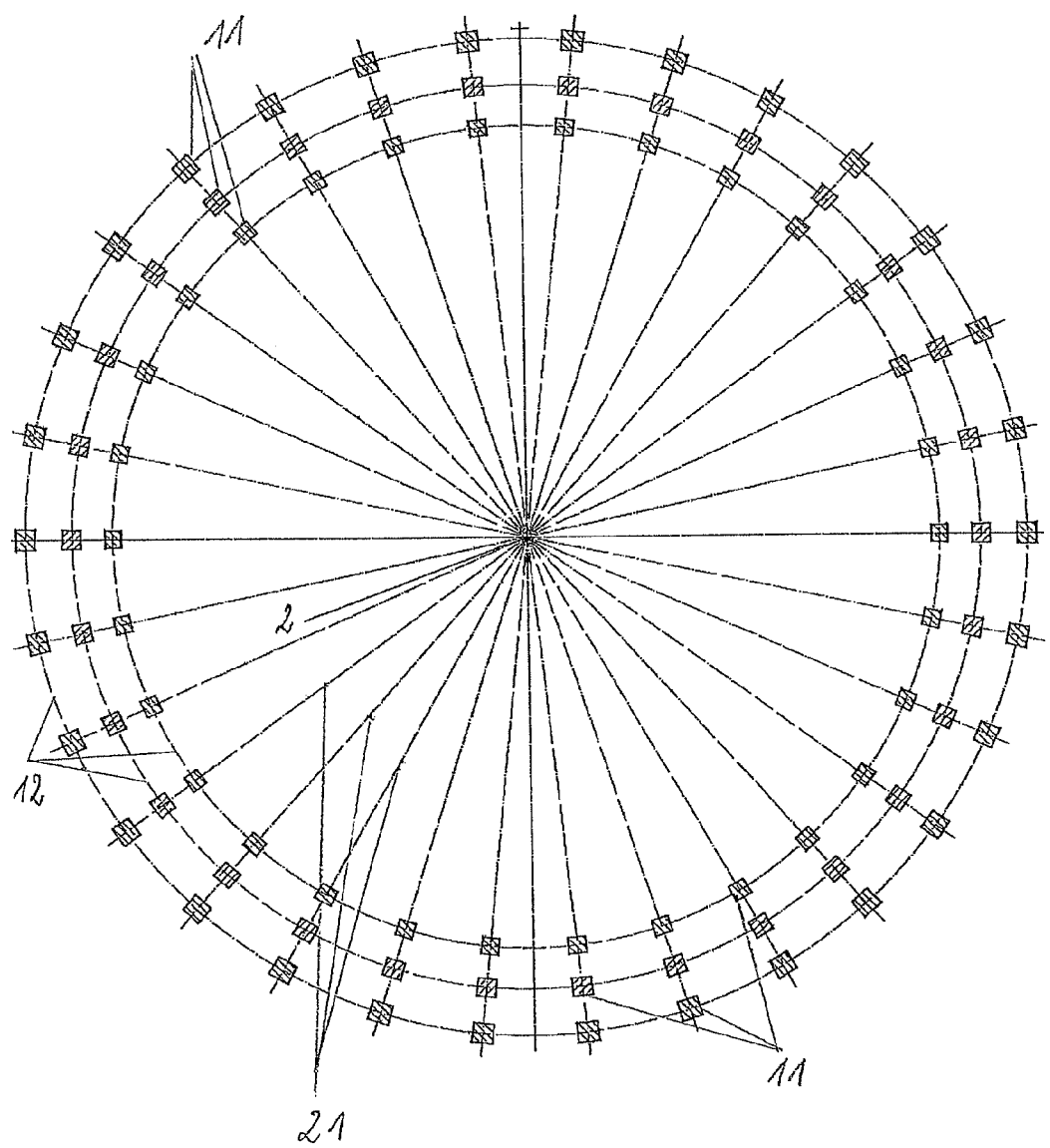
FIG. 7 shows an arrangement of spring bars as may be used in the embodiment shown in FIG. 1.
Figure 8:
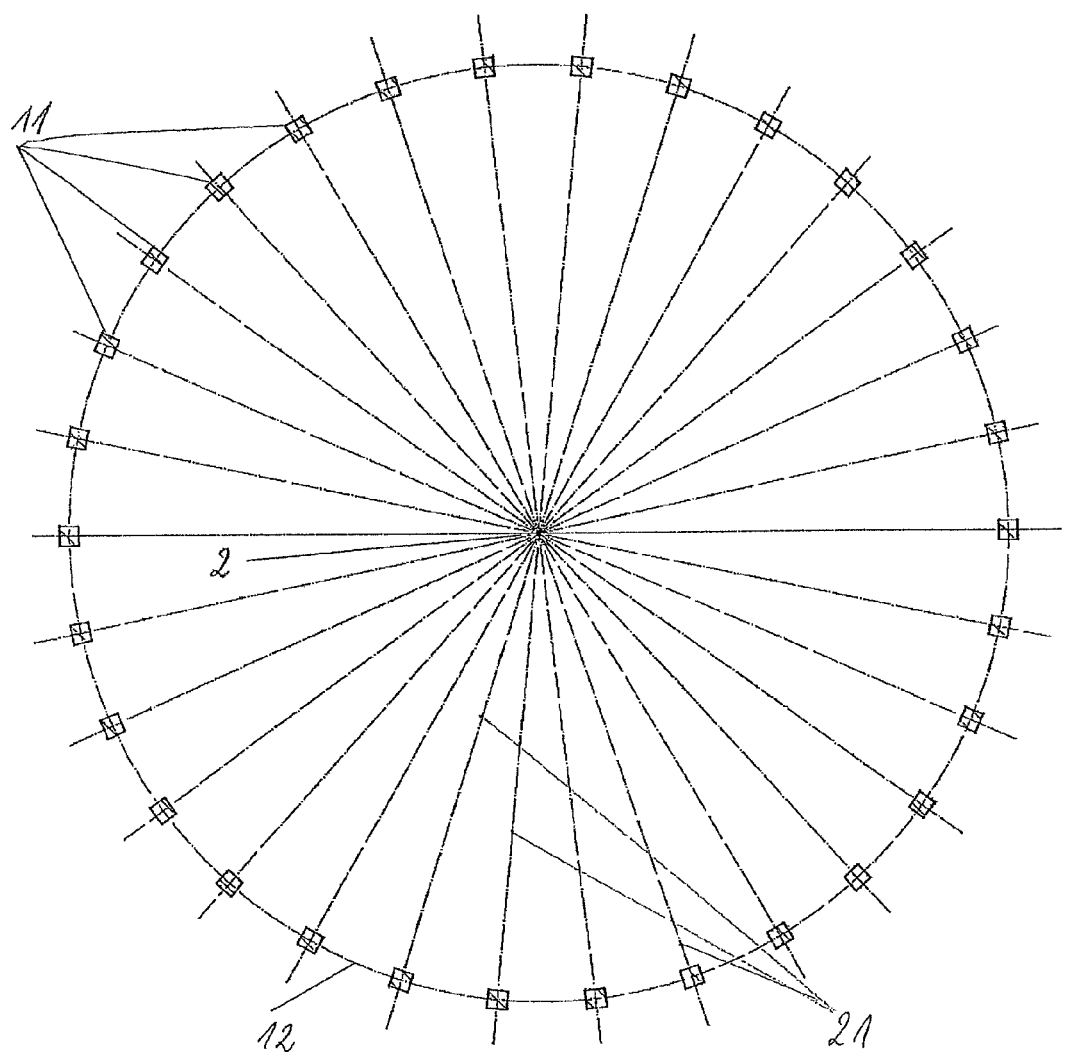
FIG. 8 shows another arrangement of spring bars as may be used in the embodiment shown in FIG. 1.

In the arrangements of spring bars shown in FIGS. 7, 8 and 9, spring bars 11 are arranged in planes 21, which have different rotary angular positions about spindle axis 2. In the embodiment shown in FIG. 7, spring bars 11 are arranged in planes 21 on different circumferences 12 about spindle axis 2. Circumferences 12 are preferably at equal radial distances from each other. However, they may also be at different radial distances from each other.

In the event that, in the arrangements of spring bars shown in FIGS. 4, 5 and 6, the groups of spring bars 30 are arranged in corners of a square, spring bars 11 in the four groups of spring bars 30 are likewise located on circumferences about spindle axis 2.

In the embodiment shown in FIG. 8, all the spring bars 11 are located on a single circumference 12 and lie in planes which have different rotary angular positions about spindle axis 2. Planes 21 having different rotary angular positions in the embodiment shown in FIGS. 7 and 8 are preferably at equal angular distances from each other.

FIG. 9 shows an embodiment for a structural part containing an arrangement of spring bars 11 as shown in FIG. 8. This structural part forms a spring cage 10 in which spring bars 11 are connected to each other at their ends by annular frames 40 and 41. Such a spring cage 10 is preferably used in the embodiment shown in FIGS. 1 and 10. A spring cage containing the arrangement of spring bars shown in FIG. 7, in which the spring bars are arranged at different circumradii in plane 21, may likewise be used in the embodiments shown.

In the embodiments shown in FIGS. 1, 2, 10 and 12, the ends of spring bars 11 are rigidly connected to stationary bearing block 9. The other ends of spring bars 11 are connected to rigid frame 3 on which balancing spindle 1 is rotatably mounted. This results in frame 3 being mounted in relation to bearing block 9 such that the frame is able to vibrate. This produces a vibrating system which is embodied as a single-plane flywheel in a plane perpendicular to spindle axis 2. A free space 32 (FIG. 1) is created for this purpose in the region of the freely vibrating ends of the spring bars, for example in annular frame 40, which is connected to rigid frame 3 by screw connections 7, for example. Such a free space is also present in the embodiment shown in FIG. 2, between the adjacent parts of bearing block 9 and frame 3 which is able to vibrate. The vibrations of frame 3 relative to bearing block 9 that are generated when conducting an unbalance measuring run on the vibrating system are detected by one or more transducers 34.

In order to fix the spring bars 11 rigidly to bearing block 9 in the manner of a spring cage 10, the annular frame 41 is fixed to bearing block 9 by screw connections 6 (FIG. 1). Ring 40 at the other end of spring bars 11 is likewise connected fixedly to frame 3 by screw connections 7.

Figure 2:
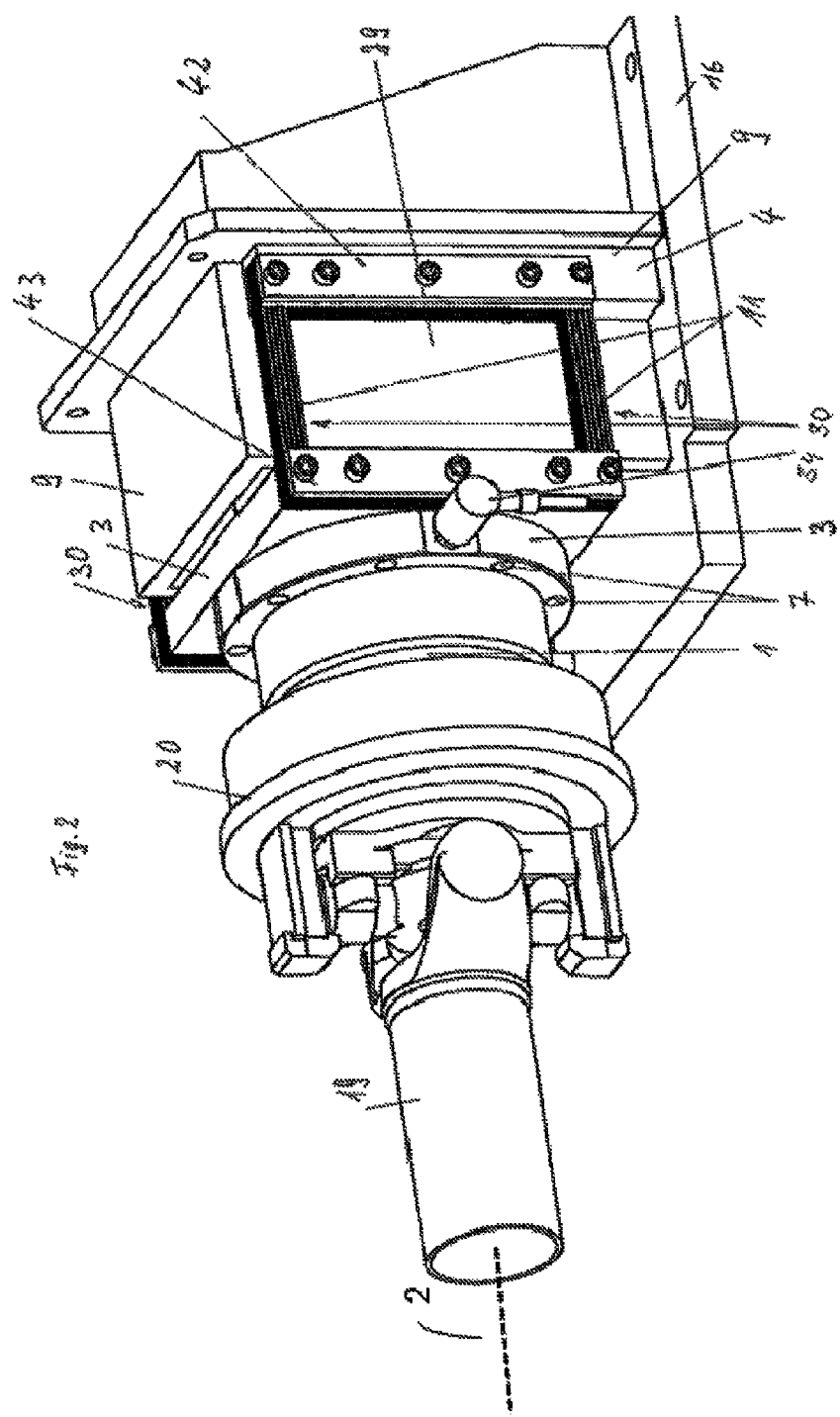
FIG. 2 shows a second embodiment.

In the embodiments shown in FIGS. 2 and 12, the spring bars are preferably formed by the slotted metal sheets shown in FIG. 5. The unslotted parts of the metal sheets are fixed at the ends of spring bars 11 with the aid of screw connections and clamping plates 42 and 43 to bearing block 9 and to frame 3 that is able to vibrate. In the embodiments shown in FIGS. 1, 2, 10 and 12, suitably shaped rigid frame members 4 may be provided on bearing block 9. Instead of screw connections, it is also possible to use other kinds of connection, to which are produced by welding, for example.

Figure 3:
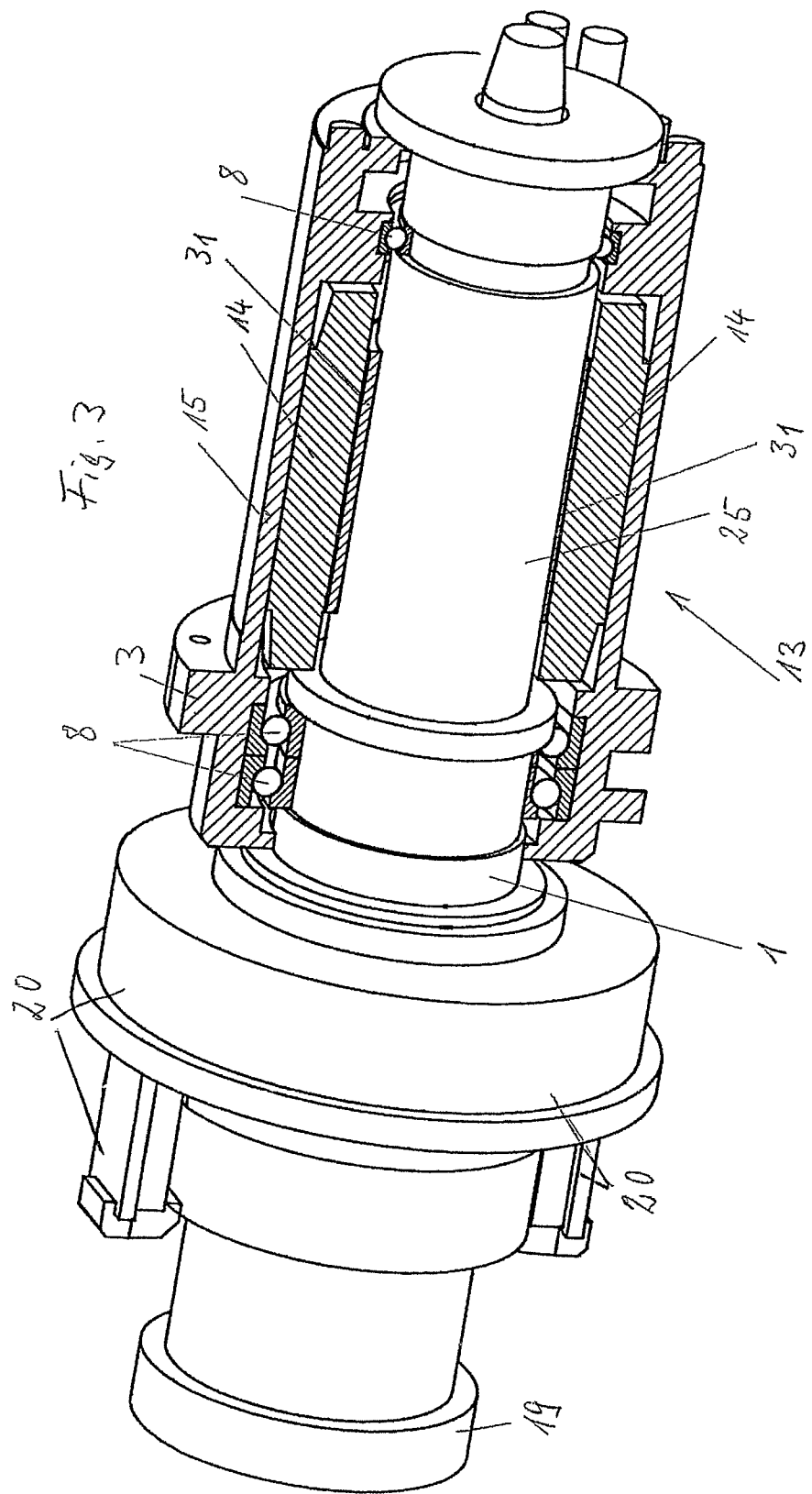
FIG. 3 shows a drive mechanism which may be used in the embodiments shown in FIGS. 1 and 2.

FIG. 3 shows an embodiment for the rotatable mounting of balancing spindle 1 on rigid frame 3, and the housing 15 which is connected thereto, in particular integrally. FIG. 3 also shows an embodiment of the electric drive mechanism 13 of balancing spindle 1. The rolling bearings provided in the region of the housing ends form a rotor bearing 8 for balancing spindle 1 in housing 15 and on frame 3 which is integral with housing 15. In the direct drive shown in the Figure, balancing spindle 1 has a spindle shaft 25 which is connected to permanent magnets 31 when a synchronous motor is used, or to the rotor winding in the case where the electric motor forming the electric drive mechanism 13 is an asynchronous motor. The stator 14 of the electric motor is fixed to housing 15. Balancing spindle 1 thus forms a rotating unit with the rotor of the electric motor of drive mechanism 13. However, it is also possible to provide an electric drive mechanism which is disposed outside frame 3 and outside housing 15 in order to drive balancing spindle 1 via a drive shaft which is preferably disposed rotatably in frame 3 and housing 15.

At its end projecting from frame 3 or housing 15, balancing spindle 1 has clamping device 20, with which the rotor to be balanced 19 can be connected non-rotatingly and centred in respect of spindle axis 2 to balancing spindle 1. In the arrangement shown in FIG. 3, balancing spindle 1 is disposed coaxially in relation to rotor 25 of the electric motor. Such a coaxial arrangement is also provided whenever the electric drive mechanism 13 is disposed outside housing 15 in order to drive balancing spindle 1. In the embodiment shown in FIG. 3, electric insulation, not shown in any further detail, may also be provided between housing 15, electric drive mechanism 13 and clamping device 20 on balancing spindle 1, wherein said insulation may be provided between the balancing spindle and rotor 25, into which balancing spindle 1 is coaxially inserted, and on the bearing of rotor 8.

In the embodiments shown in FIGS. 1, 2, 10 and 12, drive mechanism 13 and the balancing spindle 1 mounted coaxially and rotatably therein are located inside the arrangement of spring bars 11. In the embodiments shown in FIGS. 1 and 10, drive mechanism 13 and the rotatable mounting for balancing spindle 1 are located inside spring cage 10. This results in a compact arrangement of the vibrating system and of the drive mechanism for the rotor to be balanced on bearing block 9.

Arranging spring bars 11 in several planes ensures semi-isotropic mounting of the system, which is able to vibrate, on bearing block 9. Torque supports may be provided in order to increase the torsional rigidity of the measuring arrangement about the spindle axis, as shown in the embodiments in FIGS. 10 and 12. In the embodiment shown in FIG. 10, a torque support 23 is formed by a torsion-resistant collar, shown in FIG. 11, which is disposed inside spring cage 10. The torsion-resistant collar of torque support 23 is fixed at its forward collar end 26 together with the annular frame 40 of spring cage 10 to frame 3, which is capable of vibration, preferably by a shared screw connection 7. Another annular collar end 44 of the torsion-resistant collar of torque support 23 is fixed together with the annular frame 41 of spring cage 10 to frame member 4 of bearing block 9, preferably by means of screw connection 6. As shown by FIG. 10, the torsion-resistant collar of torque support 23 is located between spring cage 10 and housing 15 of the vibrating system consisting of balancing spindle 1 and drive mechanism 13 (FIG. 3). The torsion-resistant collar of torque support 23 is designed in such a way that it is torsion-resistant about spindle axis 2 and flexible in the measuring direction of transducer 34. The collar may also lie outside spring cage 10.

In the embodiment shown in FIG. 12, the torque support consists of a rigid support frame 24 which is supported against bearing block 9 on both sides of spindle 1 by leaf springs 33. The rigid support frame 24 is fixedly attached, for example with the aid of screw connections 45, to frame 3, which is capable of vibration, and on which balancing spindle 1 is rotatably mounted via rotor bearing 8. By means of said support frame 24, balancing spindle 1 is supported in a torsion-resistant manner on bearing block 9. However, due to leaf springs 33, this torque stabiliser is flexible in the direction of measurement of the at least one transducer 34, which rests on bearing block 9.

Between frame 3 on which balancing spindle 1 is rotatably mounted and mounting block 9, the embodiments shown in FIGS. 2 and 10 may also have a device which influences the vibration characteristics, in particular the resonance of the vibrating system, said device being embodied as a vibration damping mechanism 22 in the embodiment shown. This vibration damping mechanism is shown in detail in FIGS. 13 and 14. Vibration damping mechanism 22 mainly includes an expandable annular tube 35, which is disposed in a recess that is open towards the frame 3 that is able to vibrate. In the embodiment shown, between frame 3 which is able to vibrate and the opposite part of bearing block 9, there are also the annular frame 40 on spring cage 10 and the annular collar end 26 of the torsion-resistant collar of torque support 23, which are fixed to frame 3 by the shared screw connection 7. In order not to impair the vibrational capability of frame 3 while measuring the unbalance, there is a free space 32 opposite bearing block 9. In order to limit the amplitudes of vibration when the speed of the rotor to be balanced is passing through the resonance range of the system which is able to vibrate, the interior of the expandable annular tube 35 is filled, as shown in FIG. 14, with a pressure medium which may be pneumatic or hydraulic, so that when the diameter of annular tube 35 is increased, free space 32 is filled by part of annular tube 35. This influences the resonance characteristics of the vibrating system in such a way that the resonance range is passed through gently. As soon as the speed of the rotor to be balanced has reached the supercritical range during start-up, i.e. is within the range of speeds at which measurements are taken, the pressure medium is removed from the interior of annular tube 35, or the pressure reduced to such an extent that the tube returns to its original shape and the free space 32 (FIG. 13) is available again for measuring the unbalance. Another way of influencing damping is to arrange a damping ring 46 around expandable tube 35.

In the embodiment shown in FIGS. 2 and 12, vibration damping mechanisms may be used such as those which are used in the embodiment of a centre mounting 27 of rotor 19, shown in FIG. 15. This centre mounting 27 includes a rotary bearing 36 in which rotor 19 is rotatably mounted. Rotary bearing 36 is attached to frame 3, which is able to vibrate. Vibratory frame 3 is supported on bearing block 9 by means of spring bars 11. As shown in FIG. 5, spring bars 11 consist of slotted metal sheets that are fixedly connected as packets of metal sheets at the ends of spring bars 11 to vibratory frame 3 and to bearing block 9 by means of screw connections and clamping plates 42, 43. Spring bars 11 extend parallel to the rotational axis of rotor 19. To insert rotor 19, the rotary bearing provided on rotor 19 may be laid on vibratory frame 3 and rigidly connected to the latter in a known manner by means of a clamping system 36. During the measuring run, rotor 19 is driven at the end at which rotor 19 is fixed to balancing spindle 1. Vibrations resulting from rotor unbalance are detected by transducer 34.

As can be seen from FIGS. 16 and 17, a vibration damping mechanism 22 which reduces the amplitude of vibrations when the rotor speed passes through the resonance range of the vibratory system is located between bearing block 9 and vibratory frame 3 of centre mounting 27. This vibration damping mechanism 22 has a damping element 38 to the one side of which a pressure medium can be externally applied pneumatically or hydraulically via a feed line 37 for pressure medium. The damping element is pressed thereby against frame 3, such that the vibration amplitudes of the latter are damped and hence reduced when the speed of rotor 19 passes through the resonance range. To measure the unbalance, the pressure applied to damping element 38 is switched off again. As already explained, such a vibration damping mechanism may also be provided between bearing block 9 and vibratory frame 3 in the embodiments shown in FIGS. 2 and 12.

In order to be able to adjust the measuring arrangement to the respective length of the rotor while measuring the unbalance of elongate rotors 19, in particular of cardan shafts, it is advantageous to embody the lower part of bearing block 9 as a carriage 16 which can be displaced in a machine bed 5 in the axial direction of rotor 19, as schematically shown in FIG. 1. Due to this axial adjustability of bearing block 9 in relation to spindle axis 2, it is possible for rotor 19 to be fixedly connected to balancing spindle 1 in a manner that is suitable for measuring its unbalance. The centre mounting 27 (15) on bearing block 9 may also include carriage 16 in order to permit axial adjustability of centre mounting 27.

LIST OF REFERENCE SIGNS

1 Balancing spindle
2 Spindle axis
3 Vibratory frame
4 Frame member on the bearing block
5 Machine bed
6 Screw connections
7 Screw connection
8 Rotor bearing
9 Mounting block
10 Spring cage
11 Spring bars
12 Circumferences
13 Drive mechanism
14 Stator
15 Housing
16 Carriage
17 Planes
18 Planes
19 Rotor to be balanced
20 Clamping device
21 Planes
22 Vibration damping mechanism
23 Torque support
24 Rigid support frame
25 Balancer spindle shaft
26 Collar end
27 Centre mounting
28 Slot
29 Recesses
30 Group of bars
31 Magnet
32 Free space
33 Leaf spring
34 Transducer
35 Expandable annular tube
36 Clamping system
37 Feed line for pressure medium
38 Damping element
39 Metal plates
40 Annular frame
41 Annular frame
42 Clamping plate
43 Clamping plate
44 Collar end
45 Screw connections
46 Damping ring

What is claimed is:

1. An apparatus for rotatably mounting a rotor to be balanced, comprising:
   a rotatably mounted balancing spindle to which the rotor to be balanced is to be non-rotatingly connected;
   at least one bearing block;
   a plurality of spring bars aligned parallel to an axis of the balancing spindle and used to mount the balancing spindle on the bearing block such that the balancing spindle is able to vibrate; and
   a drive mechanism for the balancing spindle,
   wherein all spring bars are arranged on a single circumference or on different circumferences about the spindle axis, and
   wherein the spring bars are arranged in planes having different rotary angular positions about the spindle axis and are at equal angular distances from each other.

2. The apparatus according to claim 1, wherein the circumferences are at equal radial distances from each other.

3. The apparatus according to claim 1, wherein cross-sections of the spring bars have a circular shape or cross-sectional shapes that deviate from the circular shape.

4. The apparatus according to claim 3, wherein the cross-sectional shapes that deviate from the circular shape are rectangular or square cross-sectional shapes.

5. The apparatus according to claim 1, wherein the spindle mounted via the spring bars on the bearing block is embodied as a single-plane flywheel in a plane perpendicular to the axis of the balancing spindle.

6. The apparatus according to claim 5, wherein a first end of each of the spring bars is rigidly connected to the bearing block and a second end of each of the spring bars is connected to a rigid frame bearing the balancing spindle, in order to form the single-plane flywheel.

7. The apparatus according to claim 6, wherein a vibration damping mechanism is arranged between the bearing block and the frame bearing the balancing spindle.

8. The apparatus according to claim 1, wherein a torque support, which is torsionally resistant about the axis of the balancing spindle and flexible in at least a measuring direction, is arranged between the bearing block and the balancing spindle.

9. The apparatus according to claim 8, wherein the torque support is a collar.

10. The apparatus according to claim 1, wherein the drive mechanism is disposed inside the arrangement of spring bars.

11. The apparatus according to claim 6, wherein the drive mechanism is an electric drive, wherein the balancing spindle is disposed coaxially in relation to the rotor of the drive mechanism and is connected non-rotatingly to the rotor of the drive mechanism.

12. The apparatus according to claim 11, wherein electric insulation is arranged between an assembly consisting of a housing, the electric drive mechanism and the rigid frame, and a clamping device on the balancing spindle for the rotor to be balanced.

13. An apparatus for measuring unbalance of a cardan shaft, wherein each end of the cardan shaft is mounted in an apparatus comprising:
- a rotatably mounted balancing spindle to which the rotor to be balanced is to be non-rotatingly connected;
- at least one bearing block;
- a plurality of spring bars aligned parallel to an axis of the balancing spindle and used to mount the balancing spindle on the bearing block such that the balancing spindle is able to vibrate; and
- a drive mechanism for the balancing spindle, wherein all spring bars are arranged on a single circumference or on different circumferences about the spindle axis, and wherein the spring bars are arranged in planes having different rotary angular positions about the spindle axis and are at equal angular distances from each other.

14. An apparatus for measuring unbalance of a cardan shaft, wherein each end of the cardan shaft is mounted in an apparatus comprising:
- a rotatably mounted balancing spindle to which the rotor to be balanced is to be non-rotatingly connected;
- at least one bearing block; and
- a plurality of spring bars aligned parallel to an axis of the balancing spindle and used to mount the balancing spindle on the bearing block such that the balancing spindle is able to vibrate, wherein all spring bars are arranged on a single circumference or on different circumferences about the spindle axis,
- wherein a center mounting comprising an arrangement of the spring bars is provided for the elongate rotor, and wherein the spring bars are arranged in planes having different rotary angular positions about the spindle axis and are at equal angular distances from each other.

* * * * *